Patented Oct. 1, 1940

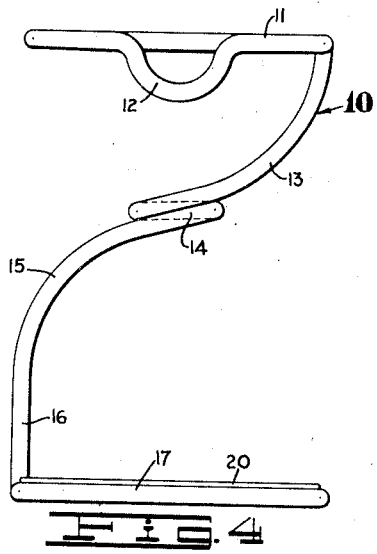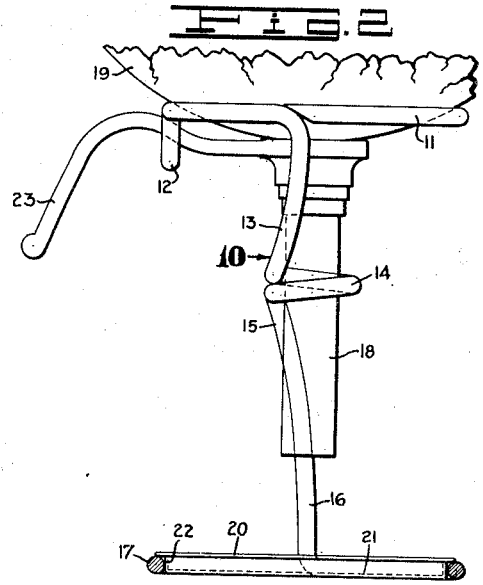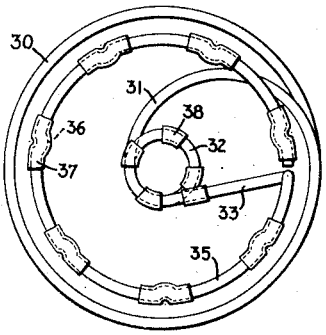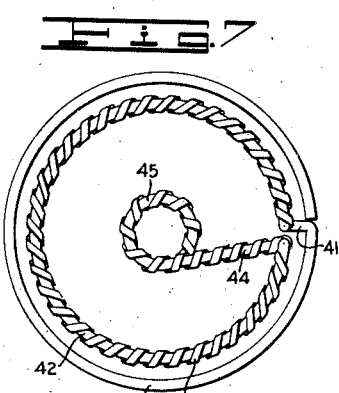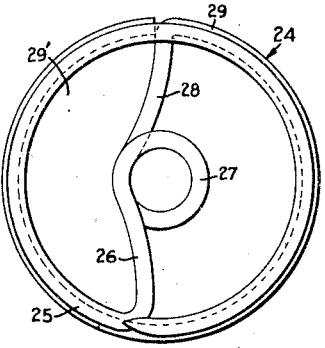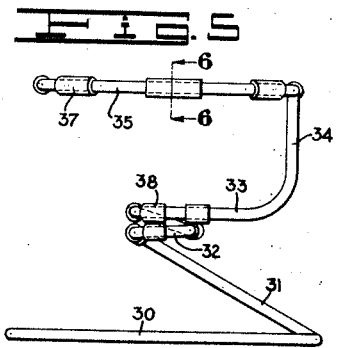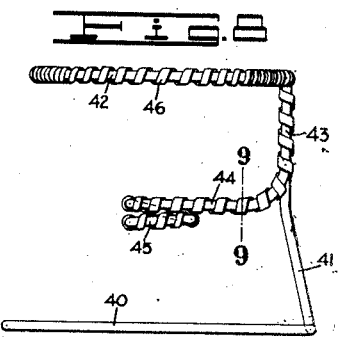

2,216,255

UNITED STATES PATENT OFFICE 2,216,255

FUNNEL SUPPORT

James Tate, Los Angeles, Calif.

Application May 15, 1939, Serial No. 273,634

3 Claims. (Cl. 65—65)

This invention relates to funnel supports.

The general object of the invention is to provide an improved support for a funnel such as the glass funnels used in making coffee.

A more specific object of the invention is to provide a coffee funnel support which includes resilient members which engage and support the funnel.

Another object of the invention is to provide an improved one piece resilient wire support for a coffee making funnel.

Another object of the invention is to provide a novel, resilient cushioned coffee funnel holding support.

Other objects and advantages of this invention will be apparent from the following description taken in connection with the accompanying drawing, wherein:

Fig. 1 is a side elevation of a funnel support embodying the features of my invention;

Fig. 2 is a view similar to Fig. 1 with the support turned through 90° and with a funnel shown fragmentarily;

Fig. 3 is a top plan view of a modified support;

Fig. 4 is a top plan view showing a further modification of my invention;

Fig. 5 is a side elevation showing the further modification;

Fig. 6 is a section taken on line 6—6 of Fig. 5;

Fig. 7 is a view similar to Fig. 4 showing another modification;

Fig. 8 is a view similar to Fig. 5 showing the last mentioned modification; and

Fig. 9 is a section taken on line 9—9 of Fig. 8.

Referring to the drawing by reference characters I have shown my invention as embodied in a coffee making funnel support which is indicated generally at 10. As shown this support is made of a single length of material such as resilient metal wire and includes an upper circular portion 11 which as shown in Figs. 1 and 2 includes a downwardly extending loop 12.

The circular portion 11 is connected to a downwardly and inwardly extending portion 13 which merges into a coiled portion 14. The coiled portion 14 merges into an outwardly and downwardly extending portion 15 which is reversely curved relative to the portion 13 as will be apparent from the drawing. The portion 15 merges into a vertical portion 16 which in turn merges into a circular base portion 17.

The portions 11, 14 and 17 are arranged coaxially so that when the neck 18 of a glass coffee maker funnel 19, as shown in Fig. 2, is inserted it will be centrally disposed on the support. The ends of the wire forming the support are preferably free so that the portions 11 and 17 form resilient rings.

The resilient ring 17 receives a receptacle 20 which has a bottom 21 and a side wall 22 with the receptacle held in place by the resiliency of the portion 17. The receptacle 20 receives the drip from the funnel neck 18.

Certain types of funnels are provided with handles 23 such as shown in Fig. 2 and for funnels of this type the loop portion 12 is provided.

In Fig. 3 I show a support 24 wherein the upper portion 25 which corresponds to the portion 11, previously described, is made in a continuous curve with the portion 12 omitted. The support 24 includes an inwardly extending portion 26, a loop 27, a downwardly extending portion 28 and a base 29 with a receptacle 29' therein.

In Figs. 4, 5 and 6 I show a modification of my invention wherein a circular base 30 is provided and from this base an upwardly directed portion 31 extends. This portion 31 merges into a loop portion 32 which in turn merges into a straight portion 33 which is outwardly directed. The portion 33 is connected to a vertically extending portion 34 which in turn merges into a circular portion 35.

The circular portion 35 is provided with indentations 36 and with rubber sleeves or cushions 37 which engage the portions 35 about the indentations 36. The loop is provided with resilient rubber sleeves 38 as shown.

In Figs. 7, 8 and 9 I show a further modification of my invention wherein the base 40 is provided with an upwardly extending portion 41 which merges into a circular portion 42. This circular portion 42 is connected to downwardly extending portion 43 which merges into an inwardly extending portion 44 which in turn is bent to form a loop 45. The portions 42, 43, 44 and 45 are preferably wrapped about with an elastic rubber member 46 which may be continuous throughout so that cushioning effect is provided for the funnel member.

In all of the modifications of my invention the circular portions are preferably coaxial with the loop portions.

From the foregoing description it will be apparent that I have invented a novel coffee funnel holding support which can be economically manufactured and which is highly efficient in use.

Having thus described my invention, I claim:

1. In a coffee funnel holding support made of a single length of wire and including a base portion, an upwardly inclined portion extending from said base portion, said upwardly inclined portion being bent to form a loop disposed coaxially with and above said base, a curved portion extending upwardly from said loop, said curved portion merging into a circular portion, said circular portion having a downwardly extending loop therein.

2. In a coffee funnel holding support made of a single length of resilient wire and including a circular base portion, an upwardly curved, inwardly directed portion extending from said base portion, said upwardly inclined portion being bent to form a complete, closed loop disposed coaxially with and above said base, said loop being of a small diameter relative to the diameter of the circular base, a curved portion extending upwardly from said loop, said curved portion merging into a circular funnel engaging portion and a receptacle portion having a side wall releasably engaging the circular base portion.

3. In a coffee funnel holding support made of a single length of resilient wire and including a circular base portion, an upwardly inclined portion extending from said base portion, said upwardly inclined portion being bent to form a loop disposed coaxially with and above said base, a curved portion extending upwardly from said loop, said curved portion merging into a circular portion, said circular portion having indentations therein and cushion members engaging the indented portions.

JAMES TATE.